March 17, 1970  O. R. JOHANSSON  3,500,501
NOZZLE SHUT-OFF DEVICE

Filed Jan. 30, 1968  2 Sheets-Sheet 1

INVENTOR.
OSKAR R. JOHANSSON
BY
ATTORNEYS

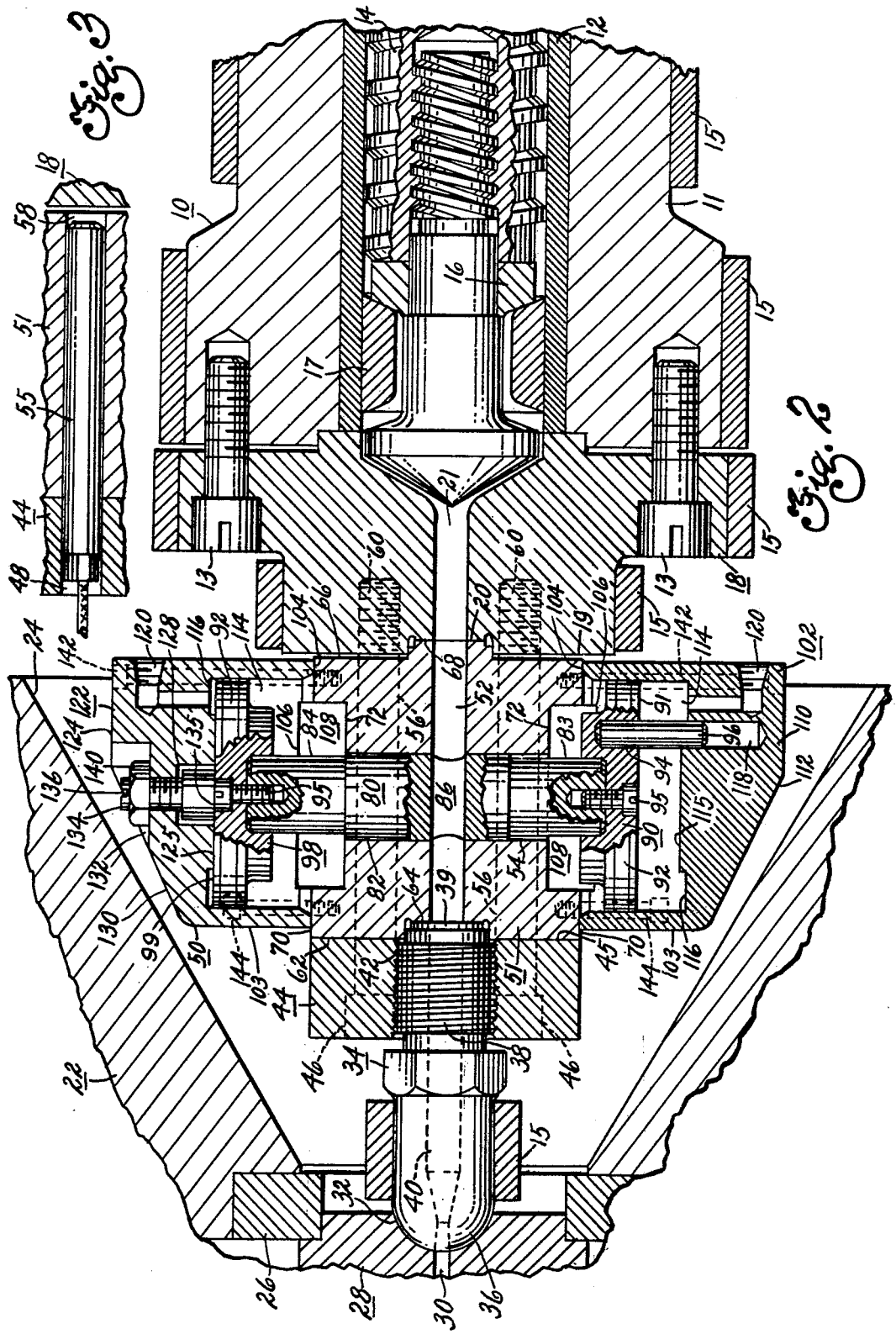

United States Patent Office 3,500,501
Patented Mar. 17, 1970

3,500,501
NOZZLE SHUT-OFF DEVICE
Oskar R. Johansson, Cincinnati, Ohio, assignor to The Cincinnati Milling Machine Co., Cincinnati, Ohio, a corporation of Ohio
Filed Jan. 30, 1968, Ser. No. 701,699
Int. Cl. B29f 1/03
U.S. Cl. 18—30     10 Claims

ABSTRACT OF THE DISCLOSURE

In an injection molding apparatus, wherein a plasticizing chamber has a nozzle attached to one end thereof, with the nozzle having a passageway therein and being in communication with the sprue of a mold, the improvement which constitutes a compact, pneumatically-powered, reciprocable spool-type device having a passageway therein, operated by alternately actuated opposed pistons, interposed between the nozzle and the plasticizing chamber, in one position blocking the communication between the plasticizing chamber and the nozzle and in the other position allowing molten material to enter the nozzle.

BACKGROUND OF THE INVENTION

This invention relates to injection molding machines in general, but particularly to the reciprocating screw or plunger type machine suitable for the injection molding of plastic and elastomeric materials. Conventional molding apparatus of the reciprocating-rotating screw type usually includes a plasticizing cylinder or chamber having a bore, wherein the plasticizing screw rotates in such a manner so as to allow the solid molding material to enter the cylinder and be plasticized as it advances in the direction of screw feed. Attached on one end of the plasticizing cylinder is a nozzle in communication with a mold sprue. As the plasticized material is deposited at the metering or front end of the screw, it developes a back pressure that forces the screw to retract in the cylinder bore and when the plasticized material reaches a predetermined volume, or shot size, the retracting screw contacts a limit switch and stops its rotation. At this stage, the shot is ready for injection into the mold, generally upon receipt of a signal from the clamp, whereupon the screw is driven forward hydraulically to inject the shot. Upon receipt of another signal, the plasticizing screw again starts to rotate and gradually retract as a fresh shot is built up in the plasticizing cylinder. Thus, the screw reciprocates once per machine cycle to plasticize and inject a shot of material.

Often, shut-off valves or devices are employed to interrupt the flow of molten material from the nozzle into the mold sprue. These offer the advantages of minimizing or entirely curtailing drool through cut off of material flow at the nozzle and provide the capability to plasticize during periods in which the clamp is open. Generally, plasticizing takes place during part curing to prevent plasticized material from escaping.

Over the years many types of shut-off devices and means to actuate them have been developed and utilized with varying degrees of success. Included among these are, for example, spring operated needle valves such as shown in FIG. 4 of U.S. Patent 3,002,229, which are generally not completely reliablein actual operation; mechanically operated pin valves such as shown in U.S. Patent 3,172,161 which are generally difficult to properly align and have multiple pivot points subject to wear; hydraulically operated rotary valves such as shown in FIG. 3 of U.S. Patent 3,169,275 which are often subject to scoring and difficult to locate near the nozzle because of high nozzle temperatures which make hydraulic operation hazardous; and hydraulically operated piston valves such as shown in FIG. 3 of U.S. Patent 3,026,567 which again are difficult to locate near the nozzle due to the high nozzle temperatures involved.

SUMMARY OF THE INVENTION

This invention solves the previously mentioned problems by interposing a compact, pneumatically powered, reciprocable spool-type valve, operated by alternately actuated opposed pistons, interposed between the nozzle and the plasticizing chamber. This nozzle shut-off valve is so compact as to be substantially contained wholly within a recess in the platen and is thusly located very close to the nozzle. Furthermore, it is pneumatically operated, i.e., by a source of pressure readily available, inexpensive, and presenting no fire hazard. This shut-off device may also be operated in any position, i.e., horizontally, vertically, or therebetween and has a very minimum of moving parts. In addition, a very simple piston-stroke adjusting means may be incorporated which allows precise spool alignment.

In summary, this invention provides a nozzle shut-off device which is interposed between a nozzle having a passageway, and a plasticizing chamber, comprising a body having a first passageway in communication with both the plasticizing chamber and the nozzle passageway, a second passageway intersecting the first passageway, a spool reciprocable in and extending through the second passageway, and having a third passageway capable of communication with the body first passageway, pistons attached to the ends of the spool, cylinders attached to the body and encompassing the pistons, a source of fluid pressure and a means to connect the source of fluid pressure alternately to the cylinders to pressurize one and vent the other, thus in one position blocking the body first passageway and in the other position connecting the spool third passageway with the body first passageway to allow molten material to enter the nozzle.

Other features and advantages to the present invention should be readily apparent by reference to the following specification, considered in conjunction with the accompanying drawings, and it is to be understood that any modification may be made in the exact structual details thereshown and described, within the scope of the appended claims, without departing from or exceeding the spirit of the invention.

DRAWING DESCRIPTION

FIG. 2 is a sectional view taken along line 2—2 of FIG. 1 and shows the nozzle shut-off device interposed between the nozzle and the plasticizing cylinder.

FIG. 3 is a sectional view taken along line 3—3 of FIG. 1 and shows the installation of an internal heating element.

DETAILED DESCRIPTION

Figures 1, 4:
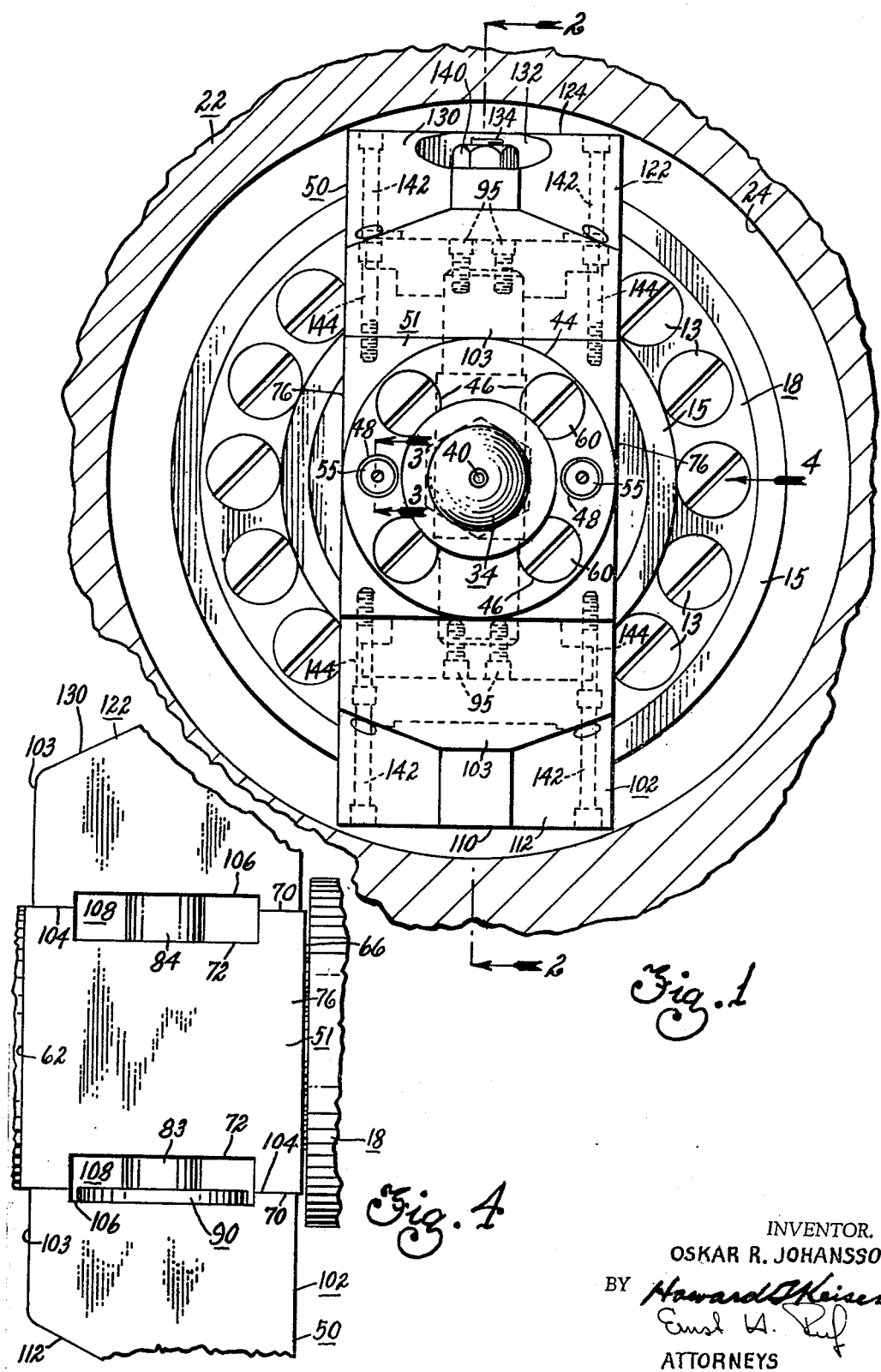
FIG. 1 is an end view of the nozzle shut-off device interposed between the nozzle and the plasticizing cylinder.
FIG. 4 is a fragmentary view looking in the direction of arrow 4 in FIG. 1.

Referring now to the drawings in detail, FIGS. 1 and 2 are an end view and sectional view respectively of nozzle shut-off valve 50 interposed between nozzle 34 and plasticizing cylinder 10 of an injection molding machine having for example, chamber or hollow plasticizing cylinder 10 composed of barrel 11, liner 12, and reciprocable and rotatable plasticizing screw 14 having screw tip 16 attached thereto, and flow-back valve 17 interposed therebetween. Cylinder end cap 18, having central axial passageway 21, flat front face 19 and front face cylindrical recess 20, is mounted to one end of plasticizing cylinder 10 by a series of equally spaced bolts 13. Heating elements, such as denoted by numeral 15, may, for example, circumferentially surround end cap 18, nozzle 34, and all or part of barrel 11.

Nozzle 34, having central axial nozzle passageway 40, hemispherical front end surface 36, threaded portion 38 and concentric cylindrical rear end portion 39, has threaded portion 38 in such engagement with threaded bore portion 42 of adaptor 44, also having four equally spaced counter bored holes 46 and rear face 45, so that concentric cylindrical rear end portion 39 extends axially from adaptor 44 parallel to face 45.

Hemispherical front end surface 36 of nozzle 34 engages hemispherical recess 32 in mold 28 so as to allow communication, axial alignment to be specific, between nozzle passageway 40 and sprue 30 of mold 28, with the latter being aligned by locating ring 26 mounted on the inner end of conical recess 24 in platen 22.

FIG. 2 shows concentric cylindrical end extension 39 of nozzle 34, extending from adaptor 44, into sealing contact with cylindrical recess 64 in front face 62 of shut-off valve body 51, the latter to be fully described later. Rear face 45 of adaptor 44 abuts front face 62 of valve body 51, while concentric cylindrical rear face extension 68 of valve body rear face 66 is in sealing contact with front face cylindrical recess 20 of cylinder end cap 18. Cylindrical recesses 20 and 64 as well as concentric cylindrical rear face extensions 39 and 68 are substantially similar in size and shape. Thus, it may be seen that nozzle shut-off valve 50, interposed between nozzle 34 and plasticizing cylinder 10, is readily removable and that adaptor 44 may be directly connected to cylinder end cap 18 upon movement to the left by plasticizing cylinder 19, so that adaptor rear face 45 abuts end cap flat front face 19 and that nozzle concentric cylindrical rear end extension 39 extends into sealing contact with front face cylindrical recess 20. Direct connection, in the absence of nozzle shut-off valve 50, between nozzle 34 and plasticizing cylinder 10 allows communication, axial alignment to be specific, between sprue 30, nozzle passageway 21 in cylinder end cap 18.

Nozzle shut off device or valve means 50 is basically composed of valve body 51, valve spool 80, pistons 90, 98, and cylinders 102, 122, all of which will now be described in detail. Valve body 51, generally rectangular in shape, has flat front face 62 with central cylindrical recess 64 parallel with flat rear face 66 having central concentric cylindrical rear face extension 68, with central first axial passageway 52 extending through valve body 51 and terminating at front and rear faces 62, 66, respectively. As previously discussed, nozzle rear end extension 39 is in sealing contact with valve body front face recess 64, while valve body rear face extension 68 is in sealing contact with cylinder end cap front face cylindrical recess 20, thus allowing communication, axial alignment to be specific, between sprue 30, nozzle passageway 40, valve body first passageway 52 and cylinder end cap passageway 21. In addition to first passageway 52, four equally spaced holes 56, axially aligned with holes 46 in adaptor 44, also extend between front and rear faces 62, 66, respectively and house bolts 60 which concurrently attach adaptor 44 and valve body 51 to each other and to cylinder end cap 18. Valve body 51 further has flat opposed side faces 76 (FIGS. 1 and 4) and flat opposed side faces 70 having cylindrical flat recesses 72, with the latter being the terminating faces of central second axial passageway 54 extending through valve body 51, with second passageway 54 intersecting and being substantially perpendicular to first passageway 52.

Reciprocable in and extending from each end of second axial passageway 54 is valve spool 80 composed of center portion 82, having third passageway 86 parallel to and capable of axial alignment with first axial passageway 52 in valve body 51, and substantially similar first and second end portions 83, 84, respectively. Attached in an axial direction to valve spool first end portion 83 by means of two bolts 95 is stepped cylindrical piston 90 having top surfaces 91, piston ring 92 and partial bore 94 with one end of guide pin 96 being secured therein. Attached in an axial direction to valve spool second end portion 84 by means of two bolts 95 is stepped cylindrical piston 98, which is substantially similar to piston 90, lacking only partial bore 94. The two bolts 95 securing each piston 90 and 98 to valve spool 80 also serve to keep valve spool 80 from rotating with respect to pistons 90 and 98.

Peripherally encompassing piston 90 and attached to valve body 51 by means of multiples of bolts 142, 144, is cylinder 102 having side wall 103, closed end 110, and open end 104, having recessed portion 106 adjacent to valve body side face 70, with portion 106 being aligned with valve body side face recess 72, thereby defining open-ended cavity 108, as best shown in FIG. 4. Cylinder closed end 110 has outer tapered portion 112, inner end surface 115 with recessed circular portion 116, partial bore 118 and partially threaded bore 120. Piston 90, fitting closely within cavity 114, is able to reciprocate therein, with piston top surface 91 being generally parallel with cylinder inner end surface 115 and recessed portion 116. The other end of guide pin 96, secured to piston 90, is slidingly received in partial bore 118 thereby keeping piston 90 from rotating with respect to cylinder 102.

Similar to the above description and using like numerals where possible, peripherally encompassing the piston 98 and attached to valve body 51 by multiples of bolts 142, 144, is cylinder 122 having side wall 103, closed end 124, open end 104 having recessed portion 106 adjacent to valve body side face 70, with portion 106 being aligned with valve body side face recess 72 to again define open-ended cavity 108. Cylinder closed end 124 has outer tapered portion 130 with recess 132, inner end surface 125 with recessed circular portion 116, partially threaded stepped bore 128 perpendicular to surface 125 and partially threaded bore 120. Piston 98 fitting closely within cavity 114 is able to reciprocate therein with piston top surface 99 being generally parallel with cylinder inner end surface 125 and recessed portion 116.

Located in partially threaded stepped bore 128 is bolt or socket head cap screw 134, having its threaded portion including slot 136 extending through cylinder closed end 124 into outer recess 132 wherein nut 140 is threaded thereon and abuts cylinder 122. Top surface 135 of cap screw 134 is generally flush with cylinder inner end surface 125 but may be advanced into cavity 114 after loosening nut 140 and turning cap screw 134 after inserting, for example, a screw driver into slot 136. Thus, cap screw 134 and nut 140 serve as a stroke adjusting means which limits the outward movement of piston 98, which is of importance since it controls the degree of axial alignment of valve body first passageway 52 and valve spool third passageway 86. Based on manufacturing tolerances, assembly tolerances and cost, it is less practical to build a nozzle shut-off valve that provides precise axial alignment between passageways 52 and 86 when this alignment can readily be accomplished at initial assembly by mere adjustment of cap screw 134 and nut 140. However, stroke adjusting means 134, 140, may be deleted if the tolerances are selected to provide satisfactory axial alignment between passageways 52 and 86. As best seen in FIGS. 1 and 3, internal heating elements 55 may be inserted into aligned holes 48 and 58 in nozzle adaptor 44 and valve body 51, respectively. This construction is not mandatory however, since an external band heater (not shown), similar to those denoted by numerals 15, may readily be utilized on the peripheral surface of adaptor 44.

In operation, a source of fluid under pressure, preferably air, is connected generally by means of flexible hosing (not shown) to partially threaded bores 120 in cylinders 102 and 122. A switching means (not shown) is utilized to alternately pressurize one and vent the other of cylinders 102, 122, thereby causing pistons 90, 98, and valve spool 80 to reciprocate in unison, thus in one position, (when cylinder 122 is pressurized and cylinder 102 is vented) blocking first passageway 52 in valve body 51, and in the other position, as shown in FIG. 2 (when cylinder 102 is pressurized and cylinder 122 is vented) axially aligning third passageway 86 in valve spool 80 with first passageway 52 in valve body 51, thereupon allowing molten, generally plastic material, as delivered by rotating and reciprocating screw 14 in plasticizing cylinder 10, to flow into cylinder end cap passageway 21, cylinder first passageway 52, valve spool third passageway 86 and nozzle passageway 40 into sprue 30. If nozzle shut-off is desired, cylinder 102 is vented and cylinder 122 is pressurized, thereby shifting valve spool third passageway 86 out of alignment or communication with valve body first passageway 52 thereby blocking the flow of molten material into nozzle passageway 40. Although nozzle shut-off valve 50 may be operated in any position, i.e., horizontally, vertically, or therebetween, operation that allows horizontal reciprocation of valve spool 80 is preferred.

Valve spool 80 and valve body second passageway 54 are substantially circular in cross-section, with valve spool central portion 82 being substantially similar in diameter to that of second passageway 54 to insure a close tolerance but smooth sliding fit. It must however be noted that valve spool 80 and valve body second passageway 54 are by no means restricted to being only circular in cross-section but may well be non-circular, rectangular, or even generally square, and in order to simplify valve body construction for the latter two configurations, valve body 51 can be made of two parts, with the first part having a square or rectangular recess into which modified spool 80 would reciprocably fit, with the second part being plate-like and serving a cover function. Non-circular valve spool configuration also eliminates the need for multiples of bolts 95 and guide pin 96 since a non-circular valve spool configuration will not allow valve spool 80 to rotate in valve body second passageway 54 and thus eliminates all axial misalignment between valve spool third passageway 86 and valve body first passageway 52 possibly caused by valve spool rotation.

Valve body second passageway 54 and valve spool center portion 82 are carefully lapped to obtain a smooth sliding fit of the latter in the former to insure not only smooth, even, reciprocating movement, requiring a minimum of air pressure and giving clean, quick and complete shifts from open to closed position and vice versa, but to also absolutely minimize the leakage of molten material from valve body first passageway 52 and valve spool third passageway 86 when valve spool 80 is shifted to closed position. It must be remembered that when valve spool 80 is shifted to closed position, valve spool third passageway 86 will contain a slug of molten material which, if tolerances are not kept close, will tend to leak into passageway 54. Leakage between passageway 54 and valve spool central portion 82 will not only increase the amount of pneumatic pressure required to shift valve spool 80 but can also cause material and color contamination if these are changed. In addition, thermally sensitive materials may also tend to decompose and could cause scoring.

This invention, as discussed above, minimizes molten material leakage and scoring but if some slight leakage should occur, substantially similar valve spool end portions 83, 84, being somewhat smaller in diameter than valve spool central portion 82, will allow this molten material, due to the reciprocating spool movement, to flow axially outwardly and away from valve spool central portion 82 into the space between valve spool end portions 83, 84, and second passageway 54 from where it will enter open ended cavities 108 defined by side face recesses 72 and cylinder open end recessed portions 106. Allowing removal of this leakage will reduce scoring.

Molten material entering open ended cavities 108, best shown in FIG. 4, will harmlessly drop out of open ended cavities 108 when nozzle shut off valve 50 is oriented to allow horizontal reciprocation of valve spool 80, during horizontal material injection, which orientation is preferred for that retson. However, even in other operating position all leakage is readily removable from cavities 108. In addition, open ended cavities 108 allow visual inspection of valve spool end portions 83, 84 not only for possible molten material leakage but also to determine whether or not valve spool 80 is properly shifting to and from its respective open and closed positions. Another benefit of this construction is that it reduces to a minimum the amount of heat transfer from valve body 51 to cylinders 102, 122, thereby minimizing cylinder and piston distortions.

An examination of FIG. 2 will show that nozzle shut-off valve 50 is so compact as to be substantially contained wholly within recess 24 of platen 22 and is thus located very close to nozzle 34. In addition, pneumatic operation is desirable since it presents no difficult or expensive sealing problems as is the case with hydraulic operation, and compressed air is generally readily available, inexpensive, and presents no fire hazards.

While this invention has been described in connection with possible forms or embodiments thereof, it is to be understood that the present disclosure is illustrative rather than restrictive and that changes or modifications may be resorted to without departing from the spirit of invention or scope of the claims which follow.

What is claimed is:

1. In an injection molding apparatus comprising a chamber having a nozzle attached near one end thereof, means for forcing molten material from said chamber through a passageway formed in said nozzle, a mold having a sprue formed therein, which sprue is in communication with the passageway formed in said nozzle, and a nozzle shut-off device interposed between said nozzle and said chamber the improvement comprising:
 (a) a body for said device having a first passageway in communication with both said chamber and the passageway formed in said nozzle and a second passageway intersecting said first passageway;
 (b) a spool reciprocal in the second passageway of said body and having a third passageway capable of communicating with the first passageway of said body;
 (c) a piston attached to each end of said spool;
 (d) a cylinder encompassing each of said pistons, said cylinders each having a closed end and an open end, with said open end being adjacent to said body and said cylinders being attached to said body;
 (e) a source of fluid pressure; and
 (f) means to connect said source of fluid pressure alternately to said cylinders to pressurize one and vent the other of said cylinders, thus causing said spool to reciprocate, thereby in one position blocking the first passageway in said body and in the other position connecting the third passageway in said spool with the first passageway in said body, thus allowing molten material to pass from said chamber into said nozzle.

2. In an injection molding apparatus comprising a plasticizing cylinder having a nozzle attached near one end thereof, means for forcing molten material from said cylinder through a passageway formed in said nozzle, a mold having a sprue formed therein, which sprue is in communication with said passageway formed in said nozzle, and valve means interposed between said nozzle and said cylinder the improvement comprising:
 (a) a valve body having a first passageway in communication with said cylinder and in axial alignment with the passageway formed in said nozzle and a second passageway intersecting said first passageway;
 (b) a valve spool reciprocable in the second passageway of said valve body and having a third passageway capable of axial alignment with the first passageway of said valve body;

(c) a piston attached to each end of said valve spool;
(d) a cylinder encompassing each of said pistons, said cylinders each having one closed end and one open end, with said open end being ajacent to said valve body and said cylinders each being attached to said valve body;
(e) a source of fluid under pressure; and
(f) means to connect said source of fluid under pressure alternately to said cylinders to pressurize one and vent the other of said cylinders, thereby causing said pistons and valve spool to reciprocate, thus in one position blocking the first passageway in said valve body and in the other position axially aligning the third passageway in said valvespool with the first passageway in said valve body, thereupon allowing molten material to enter said nozzle from said plasticizing cylinder.

3. In an injection molding apparatus comprising a temperature controllable cylinder having a nozzle attached to one end thereof, means for forcing molten material from said cylinder through a passageway formed in said nozzle, a platen with a mold having a sprue formed therein, which sprue is in communication with said passageway formed in said nozzle, and a nozzle shut-off valve interposed between said nozzle and said chamber, the improvement comprising:
(a) a valve body having a first passageway in axial alignment with both said cylinder and the passageway formed in said nozzle and a second passageway intersecting said first passageway;
(b) a valve spool reciprocable in the second passageway of said valve body and having a third passageway parallel to and capable of axial alignment with the first passageway of said valve body;
(c) a piston attached in an axial direction to each end of said valve spool;
(d) a cylinder peripherally encompassing each of said pistons and having one closed end and one open end with said open end being adjacent to said valve body and said cylinders each being attached to said valve body;
(e) a source of fluid under pressure; and
(f) means to connect said source of fluid under pressure alternately to said cylinders, to pressurize one and vent the other of said cylinders, thereby causing said pistons and valve spool to reciprocate in unison, thus in one position blocking the first passageway in said valve body and in the other position axially aligning the third passageway in said valve spool with the first passageway in said valve body, thereupon allowing molten material to enter said nozzle from said temperature controllable cylinder.

4. The injection molding apparatus of claim 3 wherein the second passageway in said valve body is substantially perpendicular to the first passageway in said valve body.

5. The injection molding apparatus of claim 3 wherein the second passageway of said valve body and said valve spool are substantially circular in cross-section and of substantially equal diameters.

6. The injection molding apparatus of claim 3 with the addition of a piston-stroke adjusting means incorporated in at least one of said cylinders.

7. The injection molding apparatus of claim 6 wherein the piston-stroke adjusting means comprises a nut and bolt assembly incorporated in the closed end of at least one of said cylinders.

8. The injection molding apparatus of claim 3 wherein the fluid under pressure which causes said pistons and valve spool to reciprocate is air.

9. The injection molding apparatus of claim 3 wherein said nozzle shut-off valve in addition to being interposed between said nozzle and said cylinder is also substantially contained within a recess in said platen.

10. The injection molding apparatus of claim 3 with the addition of at least one internal heating element incorporated into said valve body.

References Cited

UNITED STATES PATENTS

| | | |
|---|---|---|
| 2,443,554 | 6/1948 | De Mattia. |
| 2,686,934 | 8/1954 | D'Amore. |
| 2,923,031 | 2/1960 | Collion. |
| 2,972,776 | 2/1961 | Siegrist. |
| 2,992,455 | 7/1961 | Salzman. |
| 3,377,661 | 4/1968 | Corbett. |

J. SPENCER OVERHOLSER, Primary Examiner

MICHAEL O. SUTTON, Assistant Examiner

U.S. Cl. X.R.

164—304